US009695557B2

(12) United States Patent
Lins et al.

(10) Patent No.: US 9,695,557 B2
(45) Date of Patent: Jul. 4, 2017

(54) CONTROL SYSTEM FOR SELF-PROPELLED LINE STRIPER

(71) Applicant: Graco Minnesota Inc., Minneapolis, MN (US)

(72) Inventors: Christopher A. Lins, Crystal, MN (US); Thomas L. Triplett, Rockford, MN (US); James C. Schroeder, Ramsey, MN (US); Steven R. Kuczenski, New Brighton, MN (US); Barry W. Mattson, Elk River, MN (US); Brian M. Mulgrew, St. Francis, MN (US); Douglas S. Ryder, St. Michael, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 129 days.

(21) Appl. No.: 14/400,197

(22) PCT Filed: May 9, 2013

(86) PCT No.: PCT/US2013/040371
§ 371 (c)(1),
(2) Date: Nov. 10, 2014

(87) PCT Pub. No.: WO2013/170047
PCT Pub. Date: Nov. 14, 2014

(65) Prior Publication Data

US 2015/0136020 A1 May 21, 2015

Related U.S. Application Data

(60) Provisional application No. 61/645,268, filed on May 10, 2012.

(51) Int. Cl.
*E01C 23/22* (2006.01)
*E01C 23/16* (2006.01)
(Continued)

(52) U.S. Cl.
CPC ............ *E01C 23/16* (2013.01); *A63C 19/065* (2013.01); *B05B 9/007* (2013.01); *B05B 9/043* (2013.01);
(Continued)

(58) Field of Classification Search
CPC ................................ E01C 23/22; E01C 23/24
(Continued)

(56) References Cited

U.S. PATENT DOCUMENTS 3,052,077 A * 9/1962 McGlothlin ......... A01B 69/008 172/126
3,540,632 A * 11/1970 Clingan .................. E01C 23/22 222/612
(Continued)

FOREIGN PATENT DOCUMENTS

CH 326093 A 12/1957
CN 1172189 A 2/1998
(Continued)

OTHER PUBLICATIONS

Second Chinese Office Action for Chinese Patent Application No. 20138002467.3, dated May 19, 2016.
(Continued)

*Primary Examiner* — Gary Hartmann
(74) *Attorney, Agent, or Firm* — Kinney & Lange, P.A.

(57) ABSTRACT

A line striping system comprises a chassis, wheels, a spray system, a propulsion system and a steering system. The wheels are mounted under the chassis. The spray system is mounted on the chassis. The propulsion system is mounted on the chassis to drive a wheel. The steering system is coupled to the chassis. The steering system comprises a handlebar rotatable to steer a wheel, and a speed bar pivotable to control the propulsion system.

21 Claims, 6 Drawing Sheets

(51) Int. Cl.
*B05B 9/00* (2006.01)
*B05B 9/043* (2006.01)
*B05B 13/00* (2006.01)
*A63C 19/06* (2006.01)

(52) U.S. Cl.
CPC ............ *B05B 13/005* (2013.01); *E01C 23/22* (2013.01); *A63C 2019/067* (2013.01)

(58) Field of Classification Search
USPC ..................................... 404/93, 94, 108, 111
See application file for complete search history.

(56) References Cited

U.S. PATENT DOCUMENTS

| | | | | | |
|---|---|---|---|---|---|
| 4,267,973 | A * | 5/1981 | Stewart | E01C 23/22 118/305 |
| 4,624,602 | A | 11/1986 | Kieffer et al. | |
| 4,861,190 | A * | 8/1989 | Glassel | E01C 23/22 118/305 |
| 5,114,268 | A * | 5/1992 | Marcato | E01C 23/22 404/101 |
| 5,718,534 | A * | 2/1998 | Neuling | B60K 17/043 180/11 |
| 7,325,388 | B2 * | 2/2008 | Wright | A01D 34/74 56/17.1 |
| 7,611,076 | B1 | 11/2009 | Street et al. | |
| 2002/0178709 | A1 | 12/2002 | Velke et al. | |
| 2007/0044446 | A1 | 3/2007 | Wright et al. | |
| 2010/0072717 | A1 | 3/2010 | Liska | |
| 2015/0097054 | A1 * | 4/2015 | Schroeder | E01C 23/22 239/172 |

FOREIGN PATENT DOCUMENTS

| | | | |
|---|---|---|---|
| GB | 497932 | A | 12/1938 |
| JP | 2002275823 | A | 9/2002 |
| JP | 2005282249 | A | 10/2005 |
| JP | 3735263 | B2 | 1/2006 |

OTHER PUBLICATIONS

Extended European Search Report, EP Application No. 13788279.1, dated Feb. 12, 2016, 6 pages.

Patent Cooperation Treaty International Searching Authority, International Search Report and Written Opinion, May 9, 2013, 13 pages.

First Chinese Office Action for Chinese Patent Application No. 201380024467.3, dated Oct. 9, 2015, 21 pages.

* cited by examiner

CONTROL SYSTEM FOR SELF-PROPELLED LINE STRIPER

BACKGROUND

The present disclosure relates generally to line striping systems, such as those used for applying painted stripes to roadways and athletic fields. More particularly, the present disclosure relates to control systems for self-propelled line striping systems.

Line striping systems typically comprise carts that include a gas-operated engine that drives a pump. The pump is fed a liquid, such as paint, from a container disposed on the cart and supplies pressurized fluid to spray nozzles mounted so as to discharge toward the ground. Conventional line striping systems comprise walk-behind carts that are pushed by the operator, who simultaneously operates the spray nozzles with levers mounted to a handlebar for the cart. Such a handlebar typically comprises a fixed pair of handles that are used to orientate swivel-mounted wheels at the front of the cart. These handlebars require the operator to manually actuate the spray nozzles to determine the length of each stripe and the interval between stripes, while physically pushing and turning the entire system.

Line striping carts can be pushed by self-propelled trailers that attach to the rear of the carts, such as at a ball and socket hitch. Each trailer includes a gas-operated engine, separate from the pumping engine, that drives a hydrostatic propulsion system. An operator sits on the trailer and grasps the handlebar of the cart. The hydrostatic propulsion system is typically operated with foot pedals that leave hands of the operator free to manipulate the spray nozzle levers of the cart. In order to facilitate application of straight-line stripes, the front swivel-mounted wheels can be locked to promote straight-line movement of the cart. The pivot-point between the cart and the trailer at the hitch still allows for steering of the system by "wiggling" the cart relative to the trailer. These systems reduce operator fatigue, but still require operator judgment in applying the stripes and are bulky and difficult to maneuver.

There is a continuing need to increase the accuracy of lines produced by the striping system, while at the same time reducing operator fatigue.

SUMMARY

The present disclosure is directed to spray systems, such as those that can be used as self-propelled line stripers. A line striping system comprises a chassis, wheels, a spray system, a propulsion system and a steering system. The wheels are mounted under the chassis. The spray system is mounted on the chassis. The propulsion system is mounted on the chassis to drive the wheels. The steering system is coupled to the chassis. The steering system comprises a handlebar rotatable to steer a wheel, and a speed bar pivotable to control the propulsion system.

DETAILED DESCRIPTION

Figure 1A:
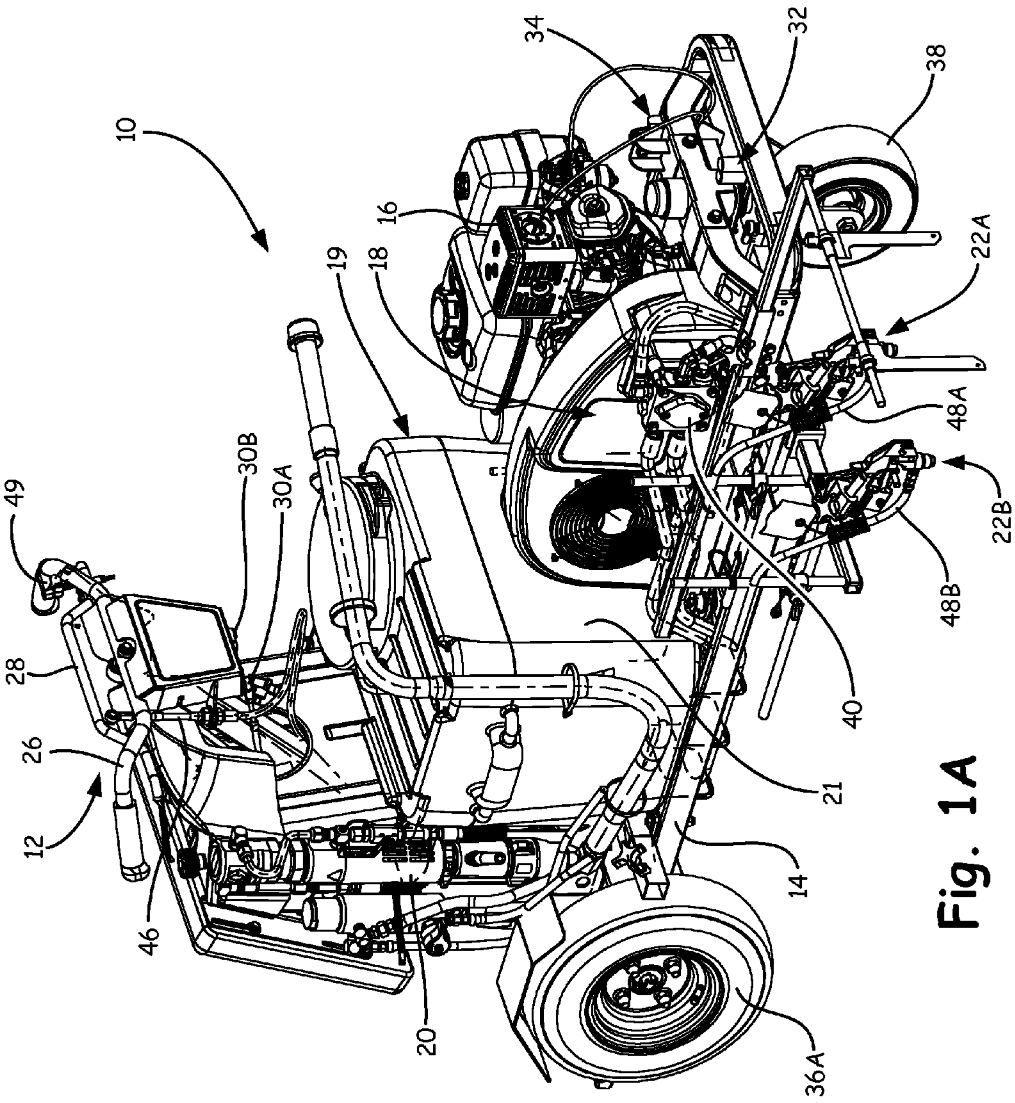
FIG. 1A is a perspective front view of a stand-on line striper in which a steering system of the present disclosure is used.
Figure 1B:
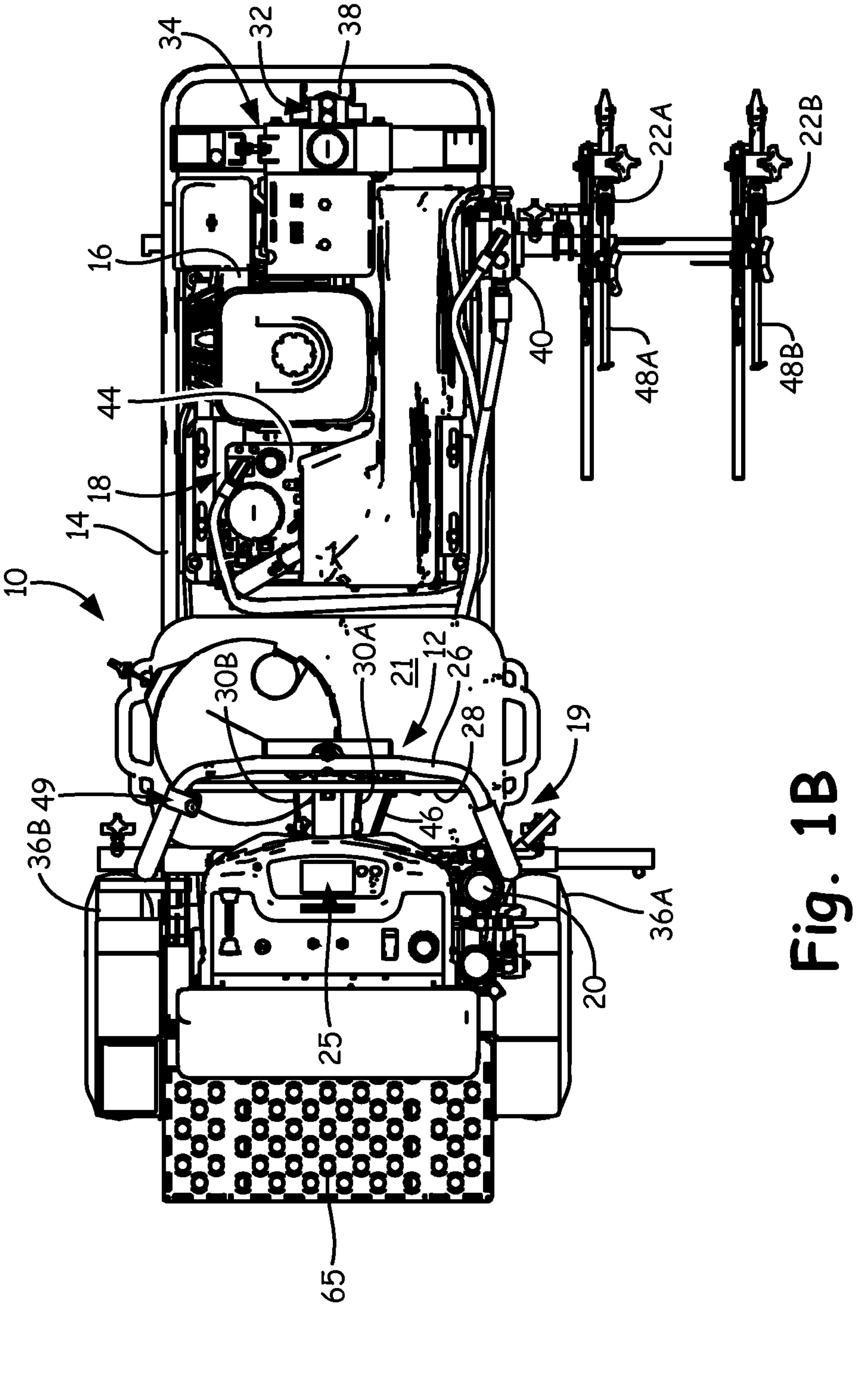
FIG. 1B is a top plan view of the stand-on line striper of FIG. 1A showing the steering system, a hydraulic system and a paint system.

FIG. 1A is a perspective front view of stand-on line striper 10 in which steering system 12 of the present disclosure is used. FIG. 1B is a top plan view of stand-on line striper 10 of FIG. 1A showing steering system 12, chassis 14, engine 16, hydraulic system 18 and paint system 19. Steering system 12 additionally includes forward and reverse speed controls. Paint system 19 comprises fluid pump 20, fluid container 21, spray guns 22A and 22B, actuators 23 (FIG. 2), solenoids 24 (FIG. 2) and controller 25. Steering system 12 includes handlebar 26, speed bar 28, steering cables 30A and 30B, centering device 32 and alignment system 34. Steering system 12 is coupled to power wheels 36A and 36B (FIG. 1B) and steering wheel 38. Hydraulic system 18 includes pump 40, motor 42 (FIG. 2) and reservoir 44 (FIG. 1B). FIGS. 1A and 1B are discussed concurrently.

Figure 2:
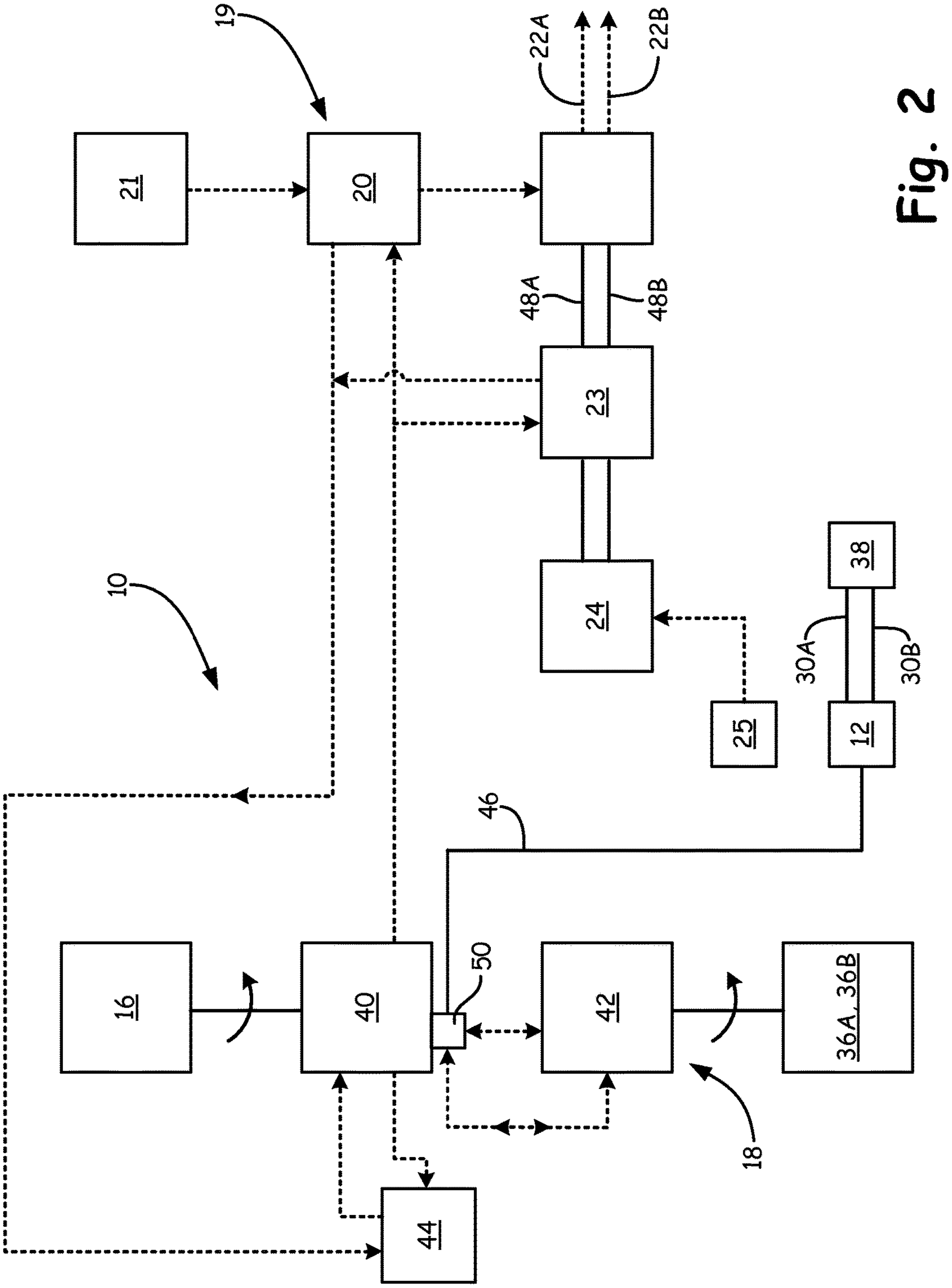
FIG. 2 is a schematic view of the hydraulic system and paint system of the stand-on line striper of FIGS. 1A and 1B interconnected with the steering system.

Power wheels 36A and 36B and steering wheel 38 are mounted to chassis 14 so as to support line striper 10 and allow line striper 10 to roll under power from hydraulic system 18. Power wheels 36A and 36B are coupled to one or more hydraulic motors 42 (FIG. 2) that receive motive fluid power from pump 40, which is driven by engine 16. Via cable 46, speed bar 28 regulates pump 40 to control fluid flow from reservoir 44 (FIG. 1B) to motors 42 (FIG. 2). As such, in one embodiment, hydraulic system 18 operates as a hydrostatic propulsion system.

Steering wheel 38 is connected to handlebar 26 of steering system 12 via cables 30A and 30B to rotate steering wheel 38 relative to chassis 14. Cables 30A and 30B are pushed and pulled by rotation of handlebar 26. Centering device 32 pulls steering wheel 38 to center when handlebar 26 is not subject to rotational force. Alignment system 34 adjusts the position of centering device 32 so as to allow for tuning of steering system 12, such as may be needed to accommodate stretching of cables 30A and 30B or wear of wheel 38.

Engine 16 provides motive power to pump 40 of hydraulic system 18, which drives both wheels 36A and 36B and paint system 19. Fluid pump 20 receives an unpressurized fluid, such as paint, from fluid container 21 and provides pressurized fluid to spray guns 22A and 22B. In one embodiment, fluid pump 20 comprises a hydraulically operated double-acting piston pump. Spray guns 22A and 22B are mechanically operated by hydraulic actuators 23 (FIG. 2) that receive pressurized hydraulic fluid from hydraulic system 18. Hydraulic actuators 23 pull cables 48A and 48B to actuate spray guns 22A and 22B. Hydraulic actuators 23 are powered by solenoids 24 (FIG. 2), which are electronically controlled by controller 25.

Controller 25 comprises a computer system that is configured to operate spray guns 22A and 22B based on operator inputs. For example, stand-on line striper 10 is configured to apply two parallel stripes of fluid from container 21 using spray guns 22A and 22B. Controller 25 controls when either or both of spray guns 22A and 22B are operated so that either one or two stripes are applied. Controller 25 also controls if the stripes are to be continuous or intermittent. If the stripes are to be intermittently applied, as specified by the operator, controller 25 controls the length of each stripe and the interval between stripes by controlling the length of time each spray gun is actuated. An operator of system 10 activates spray guns 22A and 22B with push-button 49 via controller 25, after setting desired parameters (e.g. single stripe, double stripe, stripe length, interval length) at controller 25.

FIG. 2 is a schematic view of hydraulic system 18 and paint system 19 of stand-on line striper 10 of FIGS. 1A and 1B interconnected with steering system 12. Hydraulic system 18 and paint system 19 are jointly operated by engine 16. In one embodiment, engine 16 comprises a gas-operated internal combustion engine. Engine 16 provides direct mechanical input to pump 40 via a system of belts and pulleys (not shown). Hydraulic system 18 may, however, include multiple pumps driven by engine 16. For example, a first hydraulic pump may provide input to motors 42, while a second pump may provide input to fluid pump 20, with both pumps operating with fluid from reservoir 44. Pump 40 draws hydraulic fluid from reservoir 44, and hydraulic fluid from motors 42 (FIG. 2) and pump 20 is returned to reservoir 44.

Figure 3:
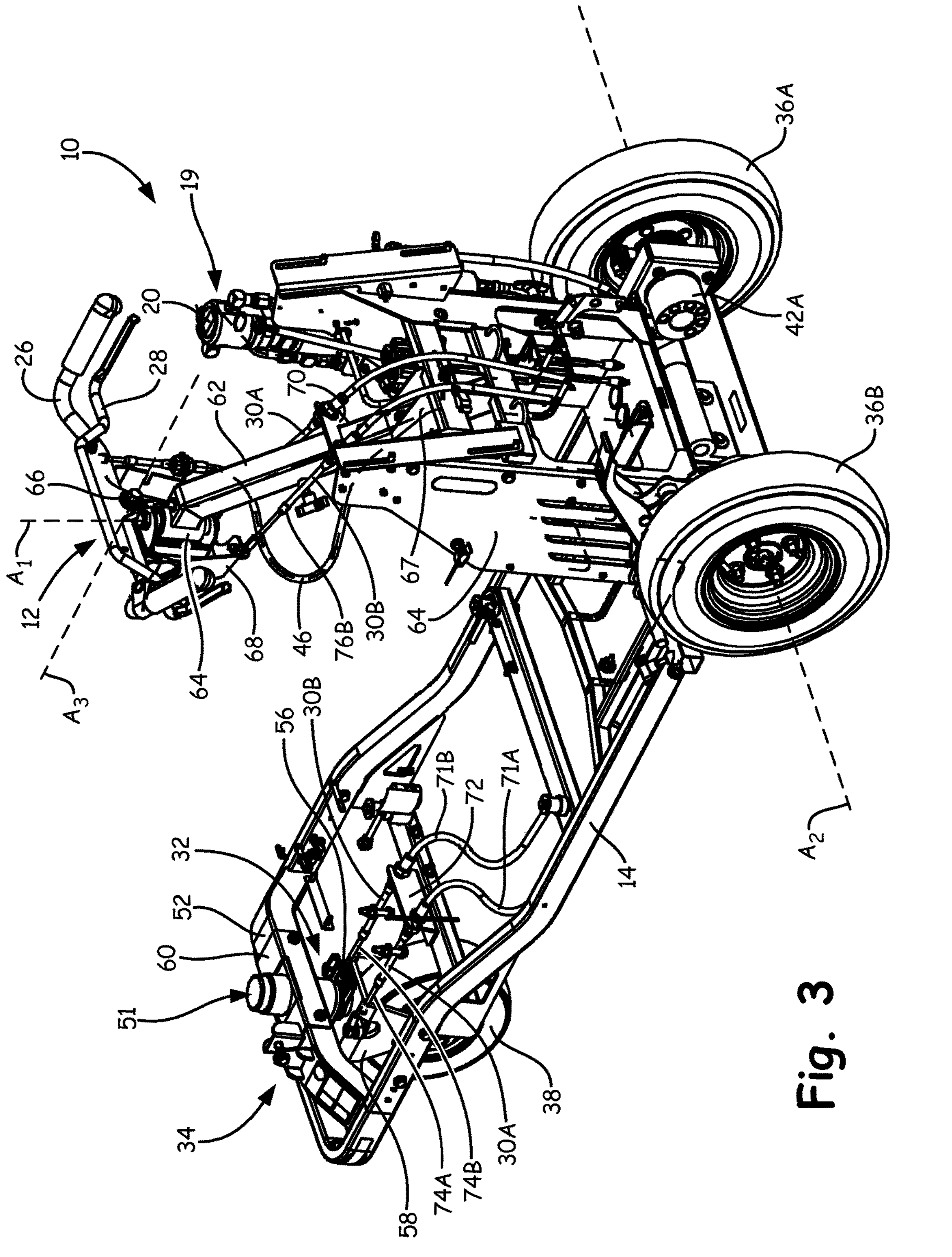
FIG. 3 is a perspective rear view of the stand-on line striper of FIGS. 1A and 1B with parts of the hydraulic system and paint system removed to show the steering system connected to a steering wheel.

In one embodiment, engine 16, pump 40, motors 42, reservoir 44, wheels 36A and 36B and valve 50 comprise a hydrostatic system, as is known in the art. Although only one motor 42 is shown in FIG. 2, each of power wheels 36A and 36B may be provided with a dedicated motor served by pump 40. For example, power wheel 36A is connected to motor 42A, as shown in FIG. 3. Motors 42 are configured to provide both forward and aft motive power to wheels 36A and 36B. Specifically, hydraulic system 18 utilizes reversing valve 50 with pump 40, as is known in the art, to reverse the direction of motors 42.

Pump 40 (or another pump within system 18) additionally provides fluid power directly to fluid pump 20, which receives a fluid from container 21. Pump 40 pressurizes the fluid from container 21 and pumps the pressurized fluid to spray guns 22A and 22B. In one embodiment, pump 20 comprises piston pump, such as the Viscount® 4-Ball piston pump commercially available from Graco Inc., Minneapolis, Minn. Spray guns 22A and 22B are lever actuated nozzles that are connected to cables 48A and 48B. Cables 48A and 48B are mechanically pulled by actuators 23. Actuators 23 comprise hydraulic cylinders that are pressurized using high pressure hydraulic fluid bled from between pumps 40 and 20. Actuators 23 are activated using electric solenoids 24 that are powered and activated by controller 25. Controller 25 includes push-button 49 (FIGS. 1A and 1B), or some other activation switch, that send a signal from controller 25 to solenoids 24 to initiate activation of actuators 23, thus discharging fluid from spray guns 22A and 22B. As shown in FIGS. 1A and 1B, push-button 49 is conveniently located within steering system 12.

Steering system 12, which includes handlebar 26 and speed bar 28 (FIGS. 1A and 1B), provides direct mechanical input to valve 50 and steering wheel 38. Specifically, cables 30A and 30B extend from handlebar 26 to steering wheel 38, while cable 46 extends between speed bar 28 and valve 50 on pump 40.

Returning to FIGS. 1A and 1B, in order to apply stripes, such as to pavement or an athletic field, the hydrostatic system is engaged to provide motive force to power wheels 36A and 36B. As such, stand-on line striper 10 rolls along the surface to which stripes are to be applied. With line striper 10 moving, an operator utilizes steering system 12 to control the speed and direction of line striper 10. Once the operator positions line striper 10 into a place where painted stripes are to be applied, paint system 19 is activated by controller 25. Steering system 12 allows the operator to control activation of paint system 19, the speed of line striper 10 and the direction of line striper 10 with easy to use, intuitive controls, as is discussed with reference to FIGS. 3-4B.

FIG. 3 is a perspective rear view of stand-on line striper 10 of FIGS. 1A and 1B with portions of hydraulic system 18 (FIG. 1A) and paint system 19 (FIG. 1A) removed to show steering system 12 connected to steering wheel 38.

Chassis 14 provides a frame upon which the various systems of line striper 10 and wheels 36A, 36B and 38 are mounted. In the embodiment shown, chassis 14 is fabricated from rectangular tubing bent into a rectilinear shape. Steering wheel 38 is mounted proximate a forward end of chassis 14 on post 51. Steering wheel 38 is positioned midway between the sides of chassis 14 in bar 52. Power wheels 36A and 36B are mounted proximate an aft end of chassis 14. In one embodiment, power wheels 36A and 36B are mounted directly onto shafts from motors 42 (FIG. 2). For example, power wheel 36A can be mounted onto a shaft from motor 42A, as shown in FIG. 3. In other embodiments, power wheels 36A and 36B can be mounted onto spindles extending from chassis 14 and connected to motors 42 via gear systems.

Centering device 32 includes spring 80 that applies force to carriage 58 to return steering wheel 38 to a “straight” position. Alignment system 34 includes guide 60 that slides on bar 52 to reorient centering device 32, as will be discussed in greater detail with reference to FIGS. 4A and 4B.

Handlebar 26 and speed bar 28 are mounted on post 62, which is connected to chassis 14 through frame 64. Frame 64 provides a structure for mounting platform 65 upon which an operator of line striper 10 may stand. In one embodiment, post 62 extends telescopically from stud 67 connected to frame 64 such that the height of handlebar 26 relative to platform 65 can be adjusted. Thus, an operator is positioned above power wheels 36A and 36B behind post 62, in position to grasp handlebar 26.

Post 62 provides pivot point 63 for handlebar 26. Pivot point 63 extends along axis A1, which extends generally perpendicularly to both the plane of chassis 14 and axis A2 along which power wheels 36A and 36B rotate. An operator of line striper 10 can rotate handlebar 26 about axis A1 to control the position of steering wheel 38 via cables 30A and 30B. Speed bar 28 is connected to handle bar 26 at pivot point 66. Pivot point 66 extends along axis A3, which extends generally parallel to the plane of chassis 14 and perpendicular to axis A2. Cable 46 extends from speed bar 28 to valve 50 that controls output of hydraulic pump 40 to hydraulic motors 42 (FIG. 2). Rotation of speed bar 28 in opposite directions causes forward or reverse movement of line striper 10. For example, rotation of speed bar 28 about axis A3 in a counter-clockwise direction from center (as depicted) causes valve 50 to route hydraulic fluid through motors 42 in a direction that causes forward movement of line striper 10, while rotation of speed bar 28 about axis A3 in a clockwise direction from center (as depicted) causes valve 50 to route hydraulic fluid through motors 42 in a direction that causes rearward movement of line striper 10.

Handlebar 26 includes handles that can be grasped to rotate handlebar about axis A1. As handlebar 26 is rotated cables 30A and 30B are pushed or pulled to rotate steering wheel 38. Cables 30A and 30B are cross-wired between handlebar 26 and wheel 38. Specifically, cable 30A extends from the right side of handlebar 26 to the left side of wheel 38, and cable 30B extends from the left side of handlebar 26 to the right side of wheel 38. Thus, for example, if handlebar 26 were rotated clockwise about axis A1, relative to the orientation of FIG. 3, cable 30B would pull on the right side of wheel 38 while cable 30A would push on the left side of wheel 38, thereby causing wheel 38 to rotate clockwise.

Cables 30A and 30B extend from fairing 68, are routed along post 62 and into frame 64 and turned back through chassis 14 to couple to carriage 58. Cables 30A and 30B extend within protective sleeves 71A and 71B, respectively, that are anchored to chassis 14 at flanges 70 and 72, thus facilitating pushing and pulling of the cables as handlebar 26 is rotated. Additionally, cables 30A and 30B include adjustable linkages that couple to carriage 58 and fairing 68. For example, cable 30B includes linkages 74B and 76B. Each linkage includes a threaded coupler that permits axial adjustment of the length of cable, and a ball joint that permits a swiveling fastening point. Fairing 68 is rigidly connected to handlebar 26 such that cables 30A and 30B rigidly connect handlebar 26 and carriage 58. Thus, rotation of handlebar 26 about axis A1 causes cables 30A and 30B to push and pull carriage 58. Cables 30A and 30B are sufficiently stiff such that each cable will push on carriage 58 when so moved. Thus, steering system 12 is operable with only one of cables 30A and 30B. However, the use of two cables provides redundancy, removes play from steering system 12 and facilitates re-centering of wheel 38.

Figure 4A:
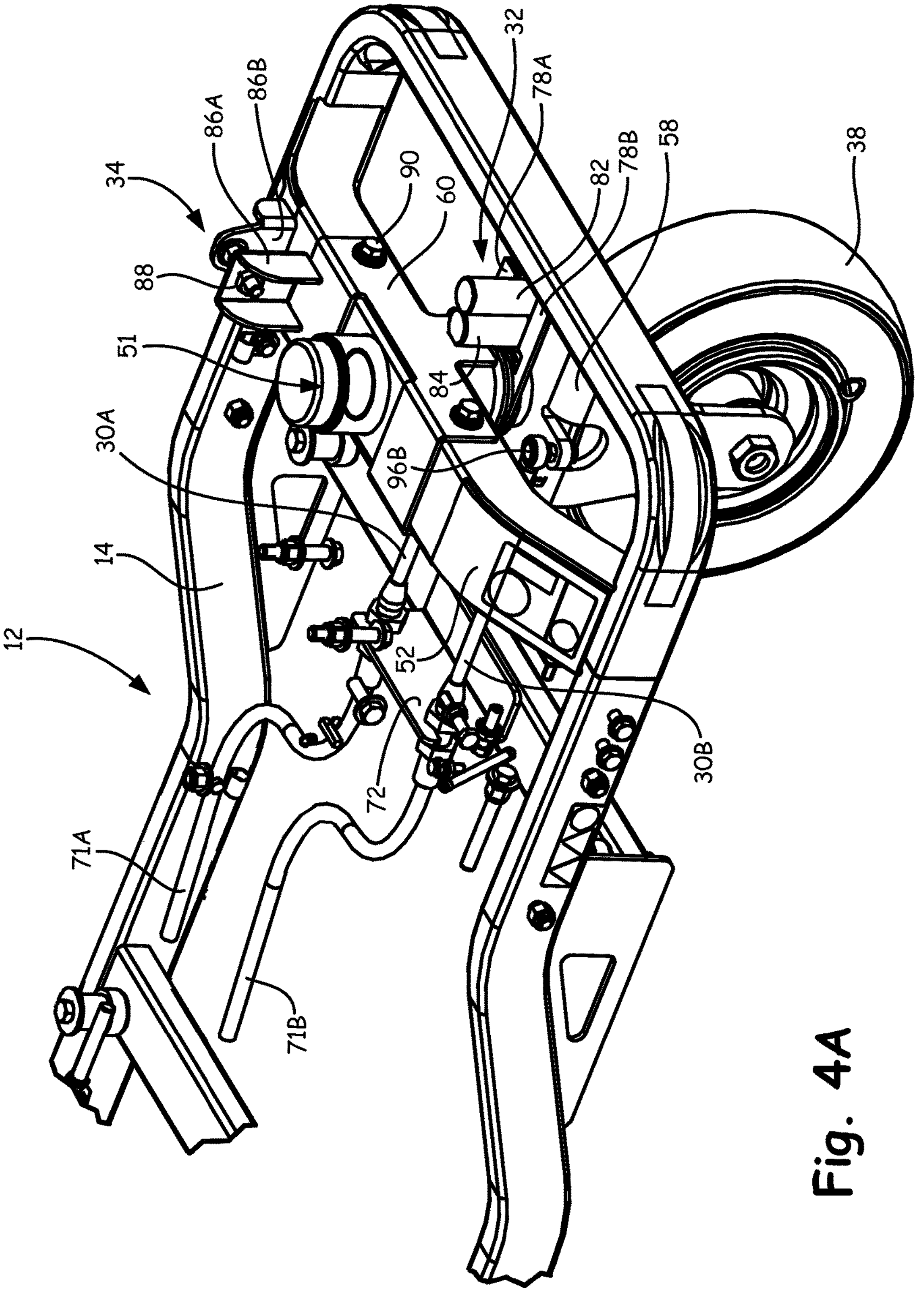
FIG. 4A is a close-up perspective view of a front portion of the steering system of FIG. 3 showing the steering wheel, a centering device and an alignment device connected to a chassis.
Figure 4B:
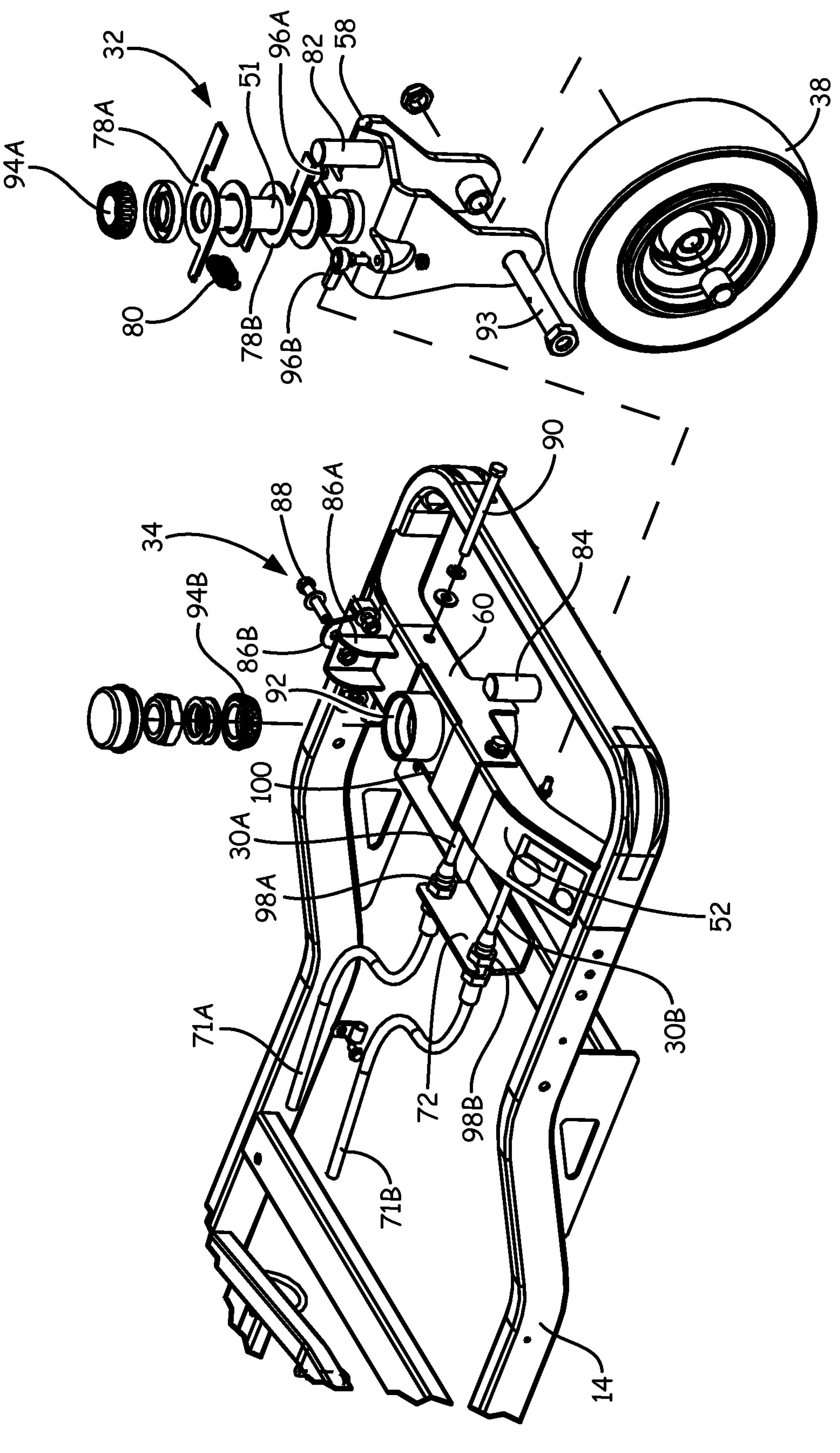
FIG. 4B is a perspective view of the steering system of FIG. 4A showing the steering wheel and the centering device exploded from the chassis.

FIG. 4A is a close-up perspective view of a front portion of steering system 12 of FIG. 3 showing steering wheel 38, centering device 32 and alignment device 34 connected to chassis 14. FIG. 4B is a perspective view of steering system 12 of FIG. 4A showing steering wheel 38 and centering device 32 exploded from chassis 14. Centering device 32 includes caliper arms 78A and 78B, spring 80 and centering post 82. Alignment device 34 includes guide 60, stop post 84, flanges 86A and 86B attached to chassis 14, adjustment fastener 88 and stop fastener 90.

Swivel post 51 of carriage 58 is inserted into socket 92 in bar 52 of frame 14. Steering wheel 38, which in one embodiment may comprise an inflatable tire, is connected to carriage 58 via shaft 93. Swivel post 51 may be provided with bearings 94A and 94B to facilitate rotation of carriage 58. Swivels 96A and 96B are connected to carriage 58 and provide rotatable joints for coupling with cables 30A and 30B. Cables 30A and 30B are anchored at flange 72 via collars 98A and 98B on sleeves 71A and 71B. Collar 98A and 98B are threaded onto cables 30A and 30B to adjust the length between flange 72 and carriage 58. Sleeves 71A and 71B are connected to flange 72 opposite collars 98A and 98B to provide a pathway for cables 30A and 30B to slide when moved by handlebar 26 (FIG. 1A).

As handlebar 26 is rotated, cables 30A and 30B apply direct rotational force to carriage 58, which rotates within socket 92 on swivel post 51. Caliper arms 78A and 78B include bores that are positioned around swivel post 51. Rearward extending portions of caliper arms 78A and 78B are linked by spring 80, and forward extending portions of caliper arms 78A and 78B squeeze centering post 82 and stop post 84 under force from the spring. Thus, caliper arms 78A and 78B operate as a scissor-type clamp. Stop post 84 is anchored to chassis 14 via alignment device 34. Thus, caliper arms 78A and 78B will rotate about swivel post 51 to align with stop post 84. Centering post 82 is also located between caliper arms 78A and 78B to bring carriage 58 into a center position tied to the position of stop post 84. Specifically, centering post 82 is pushed by the spring action of caliper arms 78A and 78B toward alignment with stop post 84. As such, centers of swivel post 51, stop post 84 and centering post 82 will be aligned along a straight line. Orientation of the straight line relative to chassis 14 can be controlled with alignment device 34.

Guide 60 sits on bar 52 of chassis 14 and includes window 100 through which socket 92 extends. Guide 60 can slide upon bar 52 to adjust the position of stop post 84 relative to chassis 14. Movement of guide 60 can be precisely controlled using fastener 88 which extends through flanges 86A and 86B. For example, fastener 88 can be threaded into flange 86A to adjust the distance between flanges 86A and 86B in conjunction with a flange on fastener 88. Fastener 90 extends through a bore in guide 60 and a slot (not shown) in bar 52 in order to immobilize stop post 84 relative to chassis 14. Repositioning of stop post 84 adjusts the orientation of caliper arms 78A and 78B on swivel post 51, which then adjusts where caliper arms 78A and 78B push alignment post 82 under force of spring 80.

The disclosure describes a self-propelled, stand-on cart upon which a line striping system can be mounted. The cart and line striping system are operated utilizing a control system that incorporates a steering system having ergonomic, easy-to-use controls. For example, a handlebar can be positioned at a comfortable height for an operator to stand behind. The handlebar includes controls for paint, steering and propulsion systems such that painting, turning and speed controls are all accessible to an operator without lifting his or her hands from the handlebar. Additionally, rotation of the handlebar provides intuitive steering control, while pivoting of a speed bar provides intuitive speed control, including forward and reverse movements. The paint system is easily operated using a push-button system mounted to the handlebar. An operator of the line striping system need not apply force to move or steer the cart, as it is self-propelled. Thus, an operator of the line striping system can apply more accurate stripes with less fatigue.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A line striping system comprising:

a chassis;

a first wheel mounted under the chassis and located toward an aft end of the chassis;

a second wheel mounted under the chassis and located toward a forward end of the chassis;

a spray system mounted on the chassis;

a propulsion system mounted on the chassis to drive the first wheel; and a steering system coupled to the chassis, the steering system comprising:

a handlebar rotatatable to steer the second wheel, wherein rotation of the handlebar in a first direction causes leftward steering and rotation of the handlebar in a second direction causes rightward steering;

a speed bar pivotable to control the propulsion system; and a spring-actuated centering device connected to the second wheel.

2. The line striping system of claim 1 wherein the spray system and the propulsion system are both powered by a single engine.

3. The line striping system of claim 1 wherein the propulsion system comprises a hydrostatic system.

4. The line striping system of claim 1 wherein pivoting of the speed bar in a first direction causes forward propulsion and pivoting of the speed bar in a second direction causes reverse propulsion.

5. The line striping system of claim 1 wherein the steering system further comprises:

a cable system connecting the handlebar and the second wheel.

6. The line striping system of claim 5 wherein the cable system includes first and second cables connected to opposite sides of the second wheel.

7. The line striping system of claim 1 wherein the spring-actuated centering device comprises:

a caliper mounted to the chassis;

a post connected to a carriage for the second wheel, the post being positioned in between arms of the caliper; and a spring configured to induce the caliper to apply force to the post to return the carriage to a straight position.

8. The line striping system of claim 1 wherein the steering system further comprises:

an adjustable alignment system coupled to the centering device.

9. The line striping system of claim 1 and further comprising:

an adjustable post connecting the handlebar to the chassis; and a pivot-point joining the speed bar to the handlebar.

10. The line striping system of claim 1 and further comprising:

an activation switch mounted on the handlebar to activate the spray system.

11. The line striping system of claim 1 wherein:

the propulsion system is a hydraulic propulsion system mounted to the chassis, the hydrostatic propulsion system comprising:

a hydraulic fluid; and a hydraulic motor driven by the hydraulic fluid and connected to the first wheel; and the spray system comprises:

a paint pump powered by the hydraulic fluid; and sprayers fluidly coupled to the paint pump.

12. The line striping system of claim 1 wherein:

the second wheel comprises:

a carriage having a swivel post connected to the chassis; and a tire mounted to the carriage; and the steering system further comprises:

a pair of linkages connecting a steering lever to the carriage.

13. The line striping system of claim 12 wherein the spring-actuated centering device comprises:

a caliper mounted to the swivel post;

a centering post extending from the carriage;

a stop post connected to the chassis;

a caliper mounted to the chassis and having arms surrounding the centering post and the stop post; and a spring coupled to the arms of the caliper to position the carriage in a preferred orientation.

14. The line striping system of claim 13 wherein:

the stop post is adjustably positioned on the chassis.

15. The line striping system of claim 12 wherein each of the pair of linkages comprises:

a flexible cable extending between the steering lever and the carriage;

a mechanism to adjust a length of the flexible cable; and a ball joint coupling the flexible cable to the carriage.

16. A line striping system comprising:

a chassis;

a first wheel and a second wheel mounted under the chassis;

a spray system mounted on the chassis, the spray system comprising a paint pump;

a propulsion system mounted on the chassis to drive the first wheel; and a steering system coupled to the chassis, the steering system comprising:

a handlebar rotatatable to steer the second wheel;

a speed bar pivotable to control the propulsion system; and a spring-actuated centering device that pulls the second wheel toward center when the handlebar is not subject to rotational force.

17. The line striping system of claim 16 wherein the spring-actuated centering device comprises:

a caliper mounted to the chassis;

a post connected to a carriage for the second wheel, the post being positioned in between arms of the caliper; and a spring configured to induce the caliper to apply force to the post to return the carriage to a straight position.

18. The line striping system of claim 16 wherein the steering system further comprises a cable system connecting the handlebar and the second wheel, wherein the cable system includes first and second cables connected to opposite sides of the second wheel.

19. The line striping system of claim 16 wherein pivoting of the speed bar in a first direction causes forward propulsion and pivoting of the speed bar in a second direction causes reverse propulsion.

20. The line striping system of claim 16 and further comprising an adjustable post connecting the handlebar to the chassis and a pivot-point joining the speed bar to the handlebar.

21. A line striping system comprising:

a chassis;

a front wheel and an aft wheel mounted under the chassis;

a spray system mounted on the chassis, the spray system comprising a paint pump;

a propulsion system mounted on the chassis to drive the aft wheel; and a steering system coupled to the chassis, the steering system comprising:

a handlebar rotatatable to steer the front wheel;

a speed bar pivotable to control the propulsion system;

a cable system having first and second cables connecting the handlebar and the front wheel, the first and second cables connected to opposite sides of the front wheel; and a spring-actuated centering device that pulls the front wheel to center, the spring-actuated centering device comprising:

a caliper mounted to the chassis;

a post connected to a carriage for the front wheel, the post being positioned in between arms of the caliper; and a spring configured to induce the caliper to apply force to the post to return the carriage to a straight position.

* * * * *